(12) United States Patent
Turner et al.

(10) Patent No.: US 7,009,748 B2
(45) Date of Patent: Mar. 7, 2006

(54) RESONANT SCANNING MIRROR WITH INERTIALLY COUPLED ACTIVATION

(75) Inventors: Arthur Monroe Turner, Allen, TX (US); Andrew S. Dewa, Plano, TX (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 85 days.

(21) Appl. No.: 11/060,835

(22) Filed: Feb. 17, 2005

(65) Prior Publication Data

US 2005/0146765 A1 Jul. 7, 2005

Related U.S. Application Data

(62) Division of application No. 10/335,738, filed on Jan. 2, 2003.

(60) Provisional application No. 60/394,321, filed on Jul. 8, 2002.

(51) Int. Cl.
*G02B 26/08* (2006.01)
(52) U.S. Cl. ...................... 359/224; 359/199; 359/201; 347/260
(58) Field of Classification Search ................ 359/198, 359/199, 201, 223, 224; 347/256–260
See application file for complete search history.

(56) References Cited

U.S. PATENT DOCUMENTS 5,245,463 A * 9/1993 Goto ........................... 359/214
5,969,465 A * 10/1999 Neukermans et al. ........ 310/333

OTHER PUBLICATIONS

Asai, Nobuaki, et al., *A Novel High Resolution Optical Scanner Actuated by Aerosol Deposited PZT Films;* IEEE 2003; pp 247-250; National Institute of Advanced Industrial Science and Technology; Namiki, Tsukuba, JAPAN.
Harris, Michael G., et al.; *A Piezoelectric Actuated Scanning Mirror System Utilizing A Type One Control Loop;* IEEE 1989; pp 1267-1374; Session 12C4; Proceedings—1989 Southeastern.
Ideda, Masaaki, et al., *PZT Thin-Film Actuator Driven Micro Optical Scanning Sensor By 3D Integration of Optical and Mechanical Devices;* IEEE 1999; pp 435-440; OMRON Corporation; Tsukuba-city, Ibaraki, JAPAN.
Ikeda, Masaaki, et al., *Two Dimensional Silicon Micromachined Optical Scanner Integrated With Photo Detector and Piezoresistor;* TRANSDUCERS '95, Jun. 25-29, 1995; pp 293-296; vol. 67—B1: OMRON Corporation, Tsukuba-city, Ibaraki, JAPAN.
Kawabata, Tatsuo, et al., *The 2-Dimensional Micro Scanner Integlated with PZT Thin Film Actuator;* TRANSDUCERS '97; Jun. 16-19, 1997: pp 339-342; OMRON Corporation: Tsukuba-city, Ibaraki, JAPAN.

(Continued)

*Primary Examiner*—James Phan
(74) *Attorney, Agent, or Firm*—William B. Kempler; W. James Brady, III; Frederick J. Telecky, Jr.

(57) ABSTRACT

A system and method for providing a resonant beam sweep about a first axis. A mirror or reflective surface supported by a first pair of torsional hinges is driven into resonant oscillations about the first axis by inertially coupling energy through the first pair of torsional hinges. A light source reflects a beam of light from the mirror such that the oscillating mirror produces a beam sweep across a target area. The resonant beam sweep is moved orthogonally on the target area by a gimbals portion of the mirror pivoting about a second axis according to one embodiment. A second independent mirror provides the orthogonal movement according to a second embodiment.

7 Claims, 14 Drawing Sheets

OTHER PUBLICATIONS

Konno, Nobuaki, et al.; *Design Optimization & Improved Performance on the Link Beam Driven Miniaturized Scanning Mirror Device;* IEEE 2000; pp 11-12; Institute of Industrial Science; Roppongi, Minato-ku, Tokyo, JAPAN.

Lee, C K, et al., *Miniature Piezoelectric Actuators: Design Concept, Fabrication and Performance Evaluation;* Smart Mater. Struct. 7 (1998) pp. 312-326; printed in the UK.

Smits, Jan G.; *Dynamic And Static Behavior of Piezoelectric Bimorphs With Extenders in Optical Scanners;* IEEE 2000; pp 1093-1096; Radiant Technologies, Albuquerque NM.

Tsaur, Jiunnjye, et al.; *Design and Fabrication of 1D and 2D Micro Scanners Actuated by Double Layered PZT Bimorph Beams;* National Institute of Advanced Industrial Science and Technology; pp 204-205; Namiki, Tsukuba, JAPAN.

Yamada, K., et al., *A Novel Asymmetric Silicon Micro-Mirror For Optical Beam Scanning Display;* IEEE, 1998, pp 110-115; NEC Corporation; Sagamihara, Kanagawa JAPAN.

* cited by examiner

RESONANT SCANNING MIRROR WITH INERTIALLY COUPLED ACTIVATION

This application is a DIV. of application Ser. No. 10/335,738 filed on Jan. 2, 2003, now pending, which claims the benefit of U.S. Provisional Application No. 60/394,321, filed on Jul. 8, 2002, entitled Scanning Mirror, which application is hereby incorporated herein by reference.

TECHNICAL FIELD

The present invention relates generally to projection displays and laser copiers. More specifically, the invention relates to the use of MEMS (micro-electric mechanical systems) type mirrors (such as torsional hinge mirrors) to provide resonant scanning of a light beam on a display screen or on a photosensitive medium. The resonant scan may be generated by using a single dual axis mirror or two single axis mirrors. A first set of torsional hinges is used for providing the resonant scan by oscillating the mirror about the torsional hinges at the mirror's resonant frequency if a dual axis mirror is used. Alternately, a first one of two single axis mirrors may be driven to resonance about its torsional hinges to provide the bi-directional scan. The second pair of torsional hinges of the dual axis mirror or the second single axis mirror provides movement about a second axis to control movement of the resonant beam sweep or scan in a direction orthogonal to the resonant scanning to maintain closely spaced parallel image lines on the projection display or photosensitive medium.

BACKGROUND

Although rotating polygon scanning mirrors are typically used in laser printers to provide a beam sweep or scan of the image of a modulated light source across a moving photosensitive medium, such as a rotating drum, there have also been prior art efforts to use a much less expensive flat mirror with a single reflective surface, such as a mirror oscillating in resonance, to provide the scanning beam. Unfortunately, these prior art efforts of using a scanning or oscillating mirror have required a compromise in performance in that only one direction of the resonant beam sweep could be used to print an image line at a right angle on a page. For example, to generate image lines that are at a right angle to a moving photosensitive medium, the scanning mirror generating the beam sweep is typically mounted at a slight angle to compensate for the movement of the photosensitive medium. It will be appreciated that the photosensitive medium typically moves at a right angle with respect to the beam sweep (such as a rotating drum). Unfortunately, if the mirror is mounted at a slight angle to compensate for medium movement during the forward beam sweep, the return beam sweeps will traverse a trajectory on the moving photosensitive drum which will be at an angle which is unacceptable with the first printed image line since the effect of the moving medium and the angle mounting of the mirror will now be additive rather than subtractive. Consequently, unlike the present invention, when such a single reflecting surface resonant mirror was used with these prior art efforts, it was necessary to interrupt the modulation of the reflected light beam and wait for the mirror to complete the return sweep or cycle and then again start scanning in the original direction. This requirement of only using one of the sweep directions of the mirror of course reduces the print speed and requires expensive and sophisticated synchronization between the mirror and the rotating drum.

The assignee of the present invention has recently developed a dual axis mirror with a single reflection surface described in U.S. patent application Ser. No. 10/384,861 filed Mar. 10, 2003, entitled "Laser Printer Apparatus Using a Pivoting Scanning Mirror". This dual axis mirror uses a first set of torsional hinges for providing oscillating beam sweep such as a resonant beam sweep and a second set of torsional hinges that selectively moves the oscillating beam sweep in a direction orthogonal to the oscillating or resonant beam sweep. By dynamically controlling the orthogonal position of the beam sweep to compensate for movement of the photosensitive medium, both directions of the resonant beam sweep may be used to print parallel image lines. Alternately, two single axis mirrors can be arranged such that one mirror provides the resonant beam sweep and the other mirror controls the orthogonal position of the beam sweep to allow both directions of the resonant beam sweep to be used for printing.

It will also be appreciated by those skilled in the art that in addition to laser printing, control of the orthogonal (vertical) position of the oscillating or resonant scan allows a single surface or flat oscillating mirror to be used to provide a full frame of raster scans suitable for use on projection displays including micro projection displays such as cell phones, Personal Digital Assistants (PDA's), notebook computers and heads-up displays. However, if such displays are to be commercially acceptable, they must be small, low cost, robust enough to withstand greater than 1000 G's of shock, and stable over the operating temperature normally experienced by hand-held products.

Consequently, it will be appreciated that the high frequency scanning mirror is a key component to the success of such products. Further, since many of the applications for such mirror projection displays are battery powered, all of the components (including the scanning mirror) must be energy efficient.

Texas Instruments presently manufactures a two axis analog mirror MEMS device fabricated out of a single piece of material (such as silicon, for example) typically having a thickness of about 100–115 microns using semiconductor manufacturing processes. The layout consists of a mirror having dimensions on the order of a few millimeters supported on a gimbals frame by two silicon torsional hinges. The gimbals frame is supported by another set of torsional hinges, which extend from the gimbals frame to a support frame or alternately the hinges may extend from the gimbals frame to a pair of hinge anchors. This Texas Instruments manufactured mirror with two orthogonal axes is particularly suitable for use with laser printers and/or projection displays. The reflective surface of the mirror may have any suitable perimeter shape such as oval, rectangular, square or other.

Similar single axis mirror devices may be fabricated by eliminating the gimbals frame altogether and extending the single pair of torsional hinges of the mirror directly to the support frame or support anchors. Two single axis mirrors rather than one dual axis mirror may be used to generate the beam scan but may require more space. Other suitable designs of single axis mirrors may also be used.

One presently used technique to oscillate the mirror about a first axis is to provide electromagnetic coil on each side of the mirror and then driving the coils with an alternating signal at the desired sweep frequency. The same technique is also used to move the sweep of the beam orthogonal to maintain a parallel raster scan. The present invention, however, discloses improved techniques for generating a resonant beam sweep.

SUMMARY OF THE INVENTION

The issues mentioned above are addressed by the present invention which, according to one embodiment, provides a mirror apparatus suitable for use as the means of generating a sweeping or scanning beam of light across the width of a target medium such as the projection screen of a display device or a photosensitive medium of a copier. According to one embodiment, the apparatus comprises a mirror device including a reflective surface portion positioned to intercept a beam of light from a light source. The reflective surface of the mirror device is supported by a first torsional hinge arrangement for pivoting around a first axis and is also supported on a gimbals frame by a second hinge arrangement for pivoting about a second axis substantially orthogonal to the first axis. Thus, pivoting of the mirror device about the first axis results in a beam of light reflected from the reflective surface scanning along the first dimension of the display screen or photosensitive medium and pivoting of the device about the second axis results in the reflective light beam moving in a direction which is substantially orthogonal to the first direction. The mirror apparatus also includes an inertially coupled first driver circuitry for causing resonant pivoting about the first axis to provide the repetitive beam sweep or scanning. Suitable inertially coupled drive circuits include electrostatic driver circuits and piezoelectric drive circuits. There is also included a second drive for pivoting the mirror about the second axis, such as for example an electromagnetic drive circuit, such that sequential images or traces are spaced from each other. According to an alternate embodiment, a first single axis mirror is driven by an inertially coupled driver circuit to generate a resonant beam sweep and a second single axis mirror uses typical electromagnetic drive coils for controlling the orthogonal position of the resonant beam sweep.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Like reference numbers in the figures are used herein to designate like elements throughout the various views of the present invention. The figures are not intended to be drawn to scale and in some instances, for illustrative purposes, the drawings may intentionally not be to scale. One of ordinary skill in the art will appreciate the many possible applications and variations of the present invention based on the following examples of possible embodiments of the present invention. The present invention relates to mirror apparatus with a moveable reflecting surface that has torsional hinges and is particularly suitable for use to provide the repetitive scans of a laser printer or the raster scan of a projection display device. The mirror apparatus of this invention includes a single two-axis resonant mirror according to one embodiment. A second embodiment uses one single axis resonant mirror in combination with a second single axis mirror for providing spaced and parallel scan lines. The second single axis mirror continuously adjusts the "vertical" movement of the beam with respect to the raster scan movement.

Figure 1:
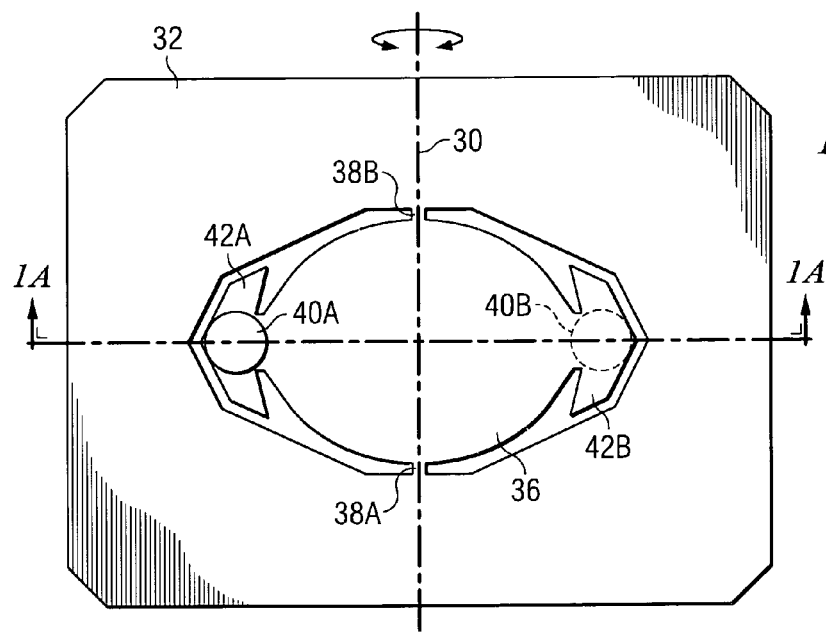
FIG. 1 illustrates an example of a single axis resonant mirror having a support frame for generating a beam sweep.
Figure 1A:
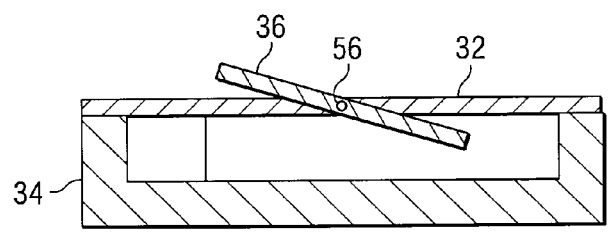
FIG. 1A is a simplified cross-sectional view taken along lines AA of FIG. 1.

Referring now to FIG. 1, there is shown a top view of a mirror apparatus having a single pair of torsional hinges for pivoting around a first axis 30. As shown, the mirror apparatus of FIG. 1 includes a support member 32 suitable for mounting to a support structure 34 as shown in FIG. 1A. FIG. 1A is a simplified cross-sectional view taken along line A—A of FIG. 1. A reflective surface or mirror portion 36 is attached to support member 32 by a pair of torsional hinges 38A and 38B.

As will be discussed in more detail hereinafter, the mirror or reflective surface portion 36 may be made to pivot or oscillate about axis 30 in response to various types of drive circuits. For example, the mirror apparatus may be driven to resonance for providing a repetitive beam sweep by electrostatic or piezoelectric drive circuits, or may by controlled much more directly to provide a slower orthogonal or vertical control to index each beam sweep to maintain spacing between successive lines on a projection display while at the same time maintaining all of the beam sweeps parallel to each other. Electromagnetic drive circuitry is particularly suitable for the vertical or orthogonal drive. When a mirror apparatus is to be used to control the orthogonal or vertical position of the beam sweep and is driven by an electromagnetic circuit, small magnets are typically included as indicated by dashed line areas 40A and 40B located on tabs 42A and 42B. The placement and use of the small magnets will be discussed in more detail with respect to FIGS. 14A through 14D. The magnets are mounted on the tabs 42A and 42B to avoid degrading the reflective surface 36.

Figure 2:
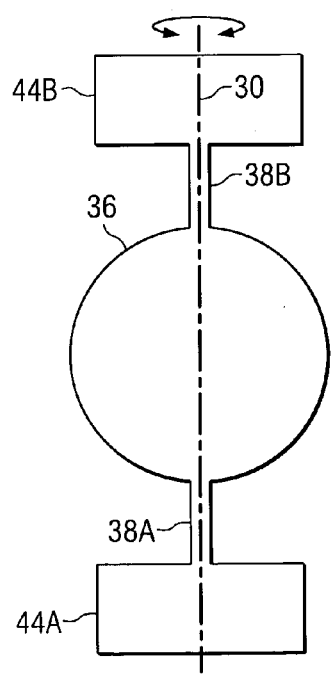
FIG. 2 is a top view of an alternate embodiment of a single axis torsional hinge mirror supported by a pair of hinge anchors rather than a support frame and having a hexagonal shaped mirror.
Figure 2A:
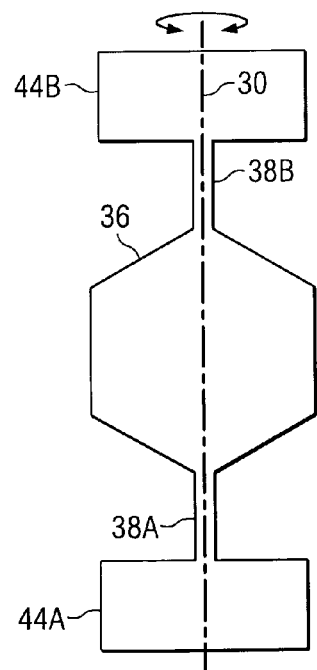
FIG. 2A is a top view of an alternate embodiment of a single axis torsional hinge mirror supported by a pair of hinge anchors rather than a support frame and having a circular shaper mirror.
Figure 2B:
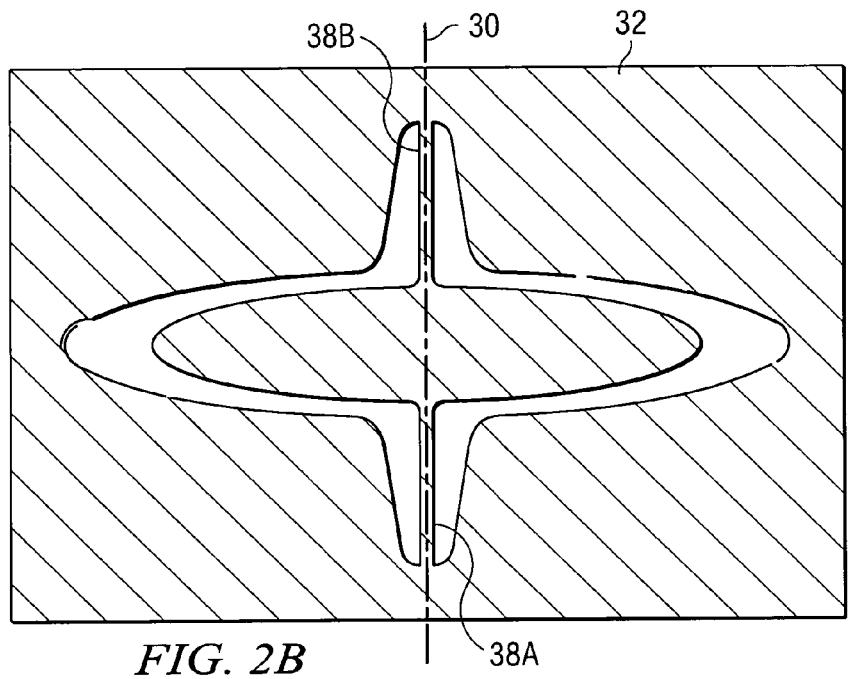
FIG. 2B is an illustration of an actual device of a single axis flat oval shaped mirror suitable for use with the present invention.

Although the mirror apparatus of FIG. 1 includes a support member or frame 32, reflective surface or mirror portion 36 may be manufactured by eliminating the support member 32 and extending the torsional hinges 38A and 38B from mirror portion 36 to a pair of hinge anchors 44A and 44B as shown in FIG. 2A. The hinge anchors are then attached or bonded to the support structure 34 as shown in FIG. 1A. FIG. 2A also illustrates that the mirror or reflective surface portion 36 may have any suitable shape or perimeter such as the hexagon shape indicated by dotted line 46. Other suitable shapes may include oval, square or octagonal. For example, FIG. 2B illustrates an actual mirror found to be suitable for use in providing the resonant beam sweep. As can be seen, the mirror portion 36A is a very flat oval shape having a long dimension of about 5.5 millimeters and a short dimension of about 1.2 millimeters.

Figure 3:
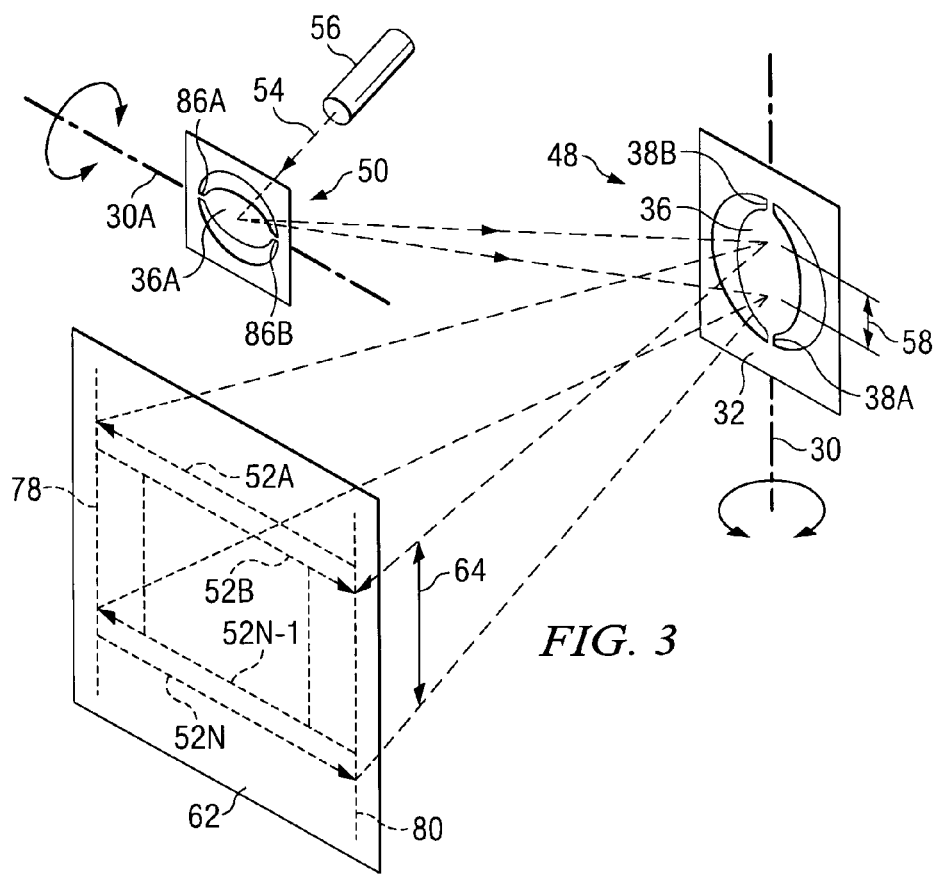
FIG. 3 is a perspective illustration of the use of two synchronized single axis mirrors such as shown in FIGS. 1, 2A and 2B to generate the bi-directional resonant beam sweep across a display screen or a moving photosensitive medium according to the teachings of an embodiment of the present invention.

Referring to FIG. 3 there is a perspective illustration of an embodiment of the present invention using two mirrors, each of which pivot about a single axis, such as the single axis mirrors shown in FIGS. 1, 2A and 2B. In addition, although FIGS. 1, 2A and 2B illustrate a single axis mirror, two dual axis mirrors of the type shown in FIG. 12 and discussed hereinafter, can be used to obtain the same results as achieved by using two single axis mirrors. For example, two of the two-axis mirror arrangements shown in FIG. 12 may be used by not providing (or not activating) the drive mechanism for one of the axes. However, if two mirrors are to be used, it is believed to be advantageous to use two of the more rugged single axis mirrors such as shown in FIGS. 1, 2A and 2B as discussed above.

Therefore, referring to FIG. 3, a first single axis analog torsional hinged mirror may be used in combination with a second similar single axis torsional mirror to solve the problems of a resonant scanning mirror type projection display or laser printer. As shown, there is a first mirror apparatus 48 such as discussed above with respect to FIGS. 1, 2A and 2B that includes a support member 32 supporting a mirror or reflective surface 36 by the single pair of torsional hinges 38A and 38B. Thus, it will be appreciated that if the mirror portion 36 can be maintained in a resonant state by a drive source, the mirror can be used to cause a resonant oscillating light beam across a photosensitive medium. However, as will also be appreciated, there also needs to be a method of moving the light beam in a direction orthogonal to the oscillation if line images are to be maintained parallel. Therefore, as will be discussed with respect to FIG. 3, a second single axis mirror apparatus 50, such as illustrated in FIGS. 1 and 2, may also used to provide the vertical movement of the light beam.

The system of the embodiment of FIG. 3 uses the first single axis mirror apparatus 48 to provide the right to left, left to right resonant sweep as represented by dotted lines 52A, 52B, 52N-1 and 52N. However, the up and down control of the beam trajectory is achieved by locating the second single axis mirror apparatus 50 such that the reflective surface or mirror portion 36A intercepts the light beam 54 emitted from light source 56 and then reflects the intercepted light to the mirror apparatus 48 which is providing the resonant sweep motion. Line 58 shown on mirror surface 36 of resonant mirror 48 illustrates how mirror 36A rotates around axis 60 to move the light beam 54A up and down on reflective surface 36 of mirror apparatus 48 during the left to right and right to left beam sweep so as to provide parallel lines 52A, 52B through 52N-1 and 52N on a projection display screen or a moving medium 62. Double headed arrow 64 illustrates the vertical or orthogonal movement of the beam sweep projected from mirror surface 36 of mirror apparatus 48.

Figure 3A:
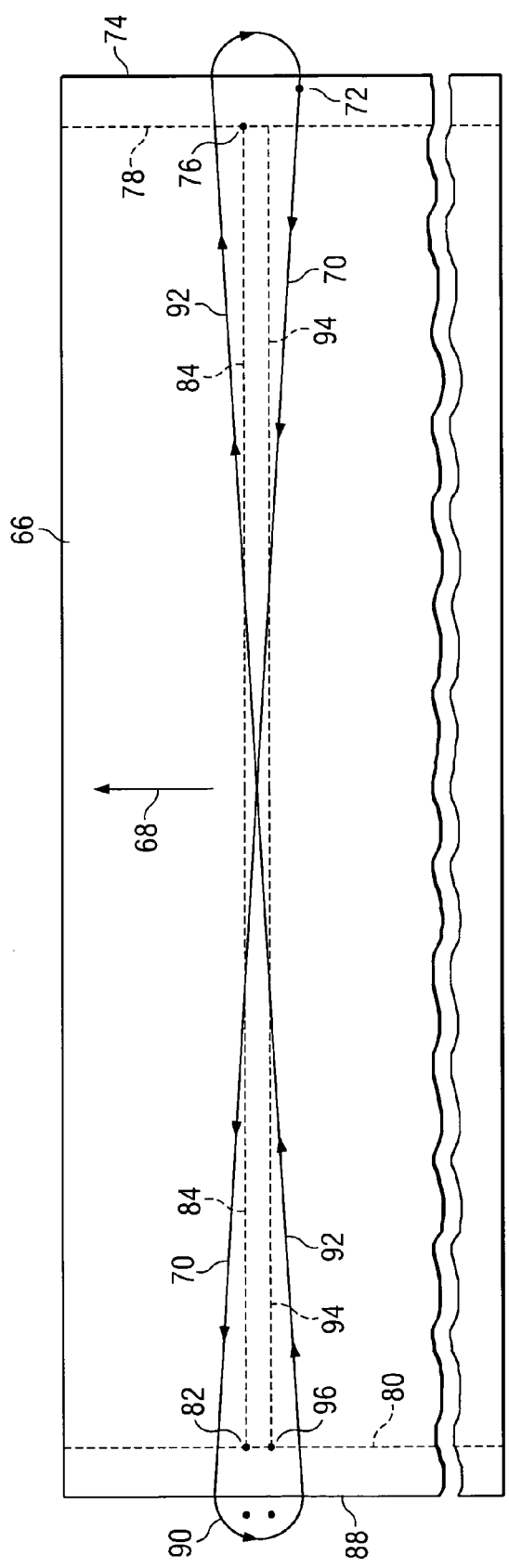
FIG. 3A illustrates one complete resonant beam sweep projected onto a moving photosensitive medium of a laser copier.
Figure 3B:
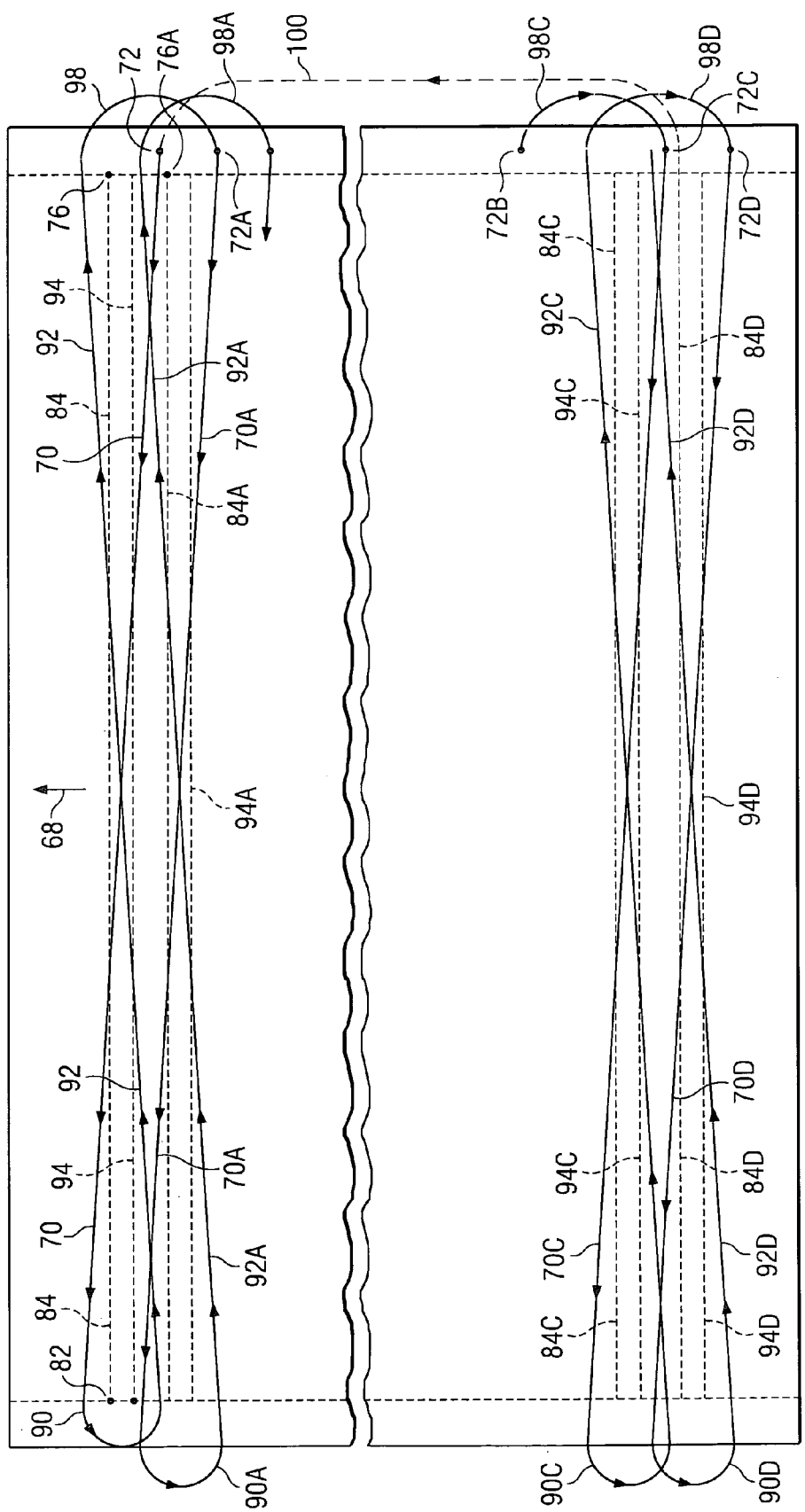
FIG. 3B illustrates a beam sweep path of a frame of image lines projected onto a display screen.
Figure 4A:
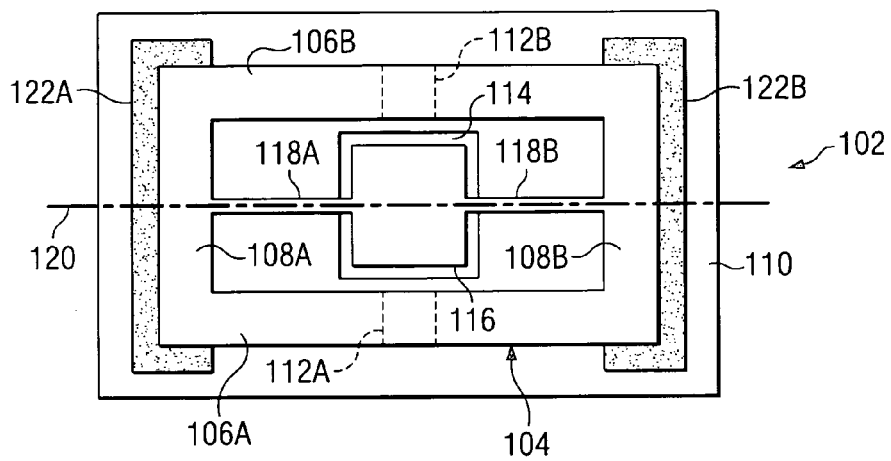
FIGS. 4A and 4B, 5A and 5B, 6A and 6B illustrate different arrangements for using inertially coupled electrostatic drive circuitry to generate the resonant scanning or pivoting about the torsional axis of a single axis mirror.
Figure 4B:
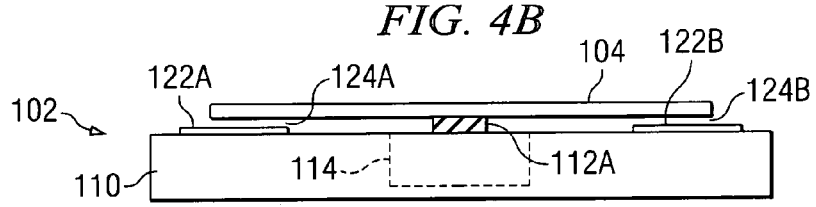

Referring now to FIGS. 3A and 3B, there is shown an exaggerated schematic of the light beam trajectory responsive to movement about two axes during a complete resonant cycle of mirror apparatus 48. As discussed above, the movement about two axes may be provided by two single axis mirrors as illustrated in FIG. 3 or a single dual axis mirror to be discussed later. The beam trajectory illustrated in FIG. 3A is shown with a photosensitive medium 66 moving as indicated by arrow 68 to illustrate how the beam trajectory generates parallel image lines for a laser copier during successive scan lines of a single resonant cycle. In the example shown in FIG. 3A, a right to left movement portion of the beam trajectory is identified by the reference number 70. It should be understood that the term "beam trajectory" as used herein does not necessarily mean that the laser light is on or actually providing light. The term is used herein to illustrate the path that would be traced if the light was actually on at all times. As will be appreciated by those skilled in the art, the light source is typically turned on and off continuously due to modulation and is also typically switched off at the two ends (left and right) of a scan or sweep. However, the modulation pattern can vary from being on for the complete scan or sweep to being off for the complete scan. Modulation of the scanning beam, and switching off at the end portion of a scan is also, of course, true for all types of laser printers including laser printers which use a rotating polygon mirror. Therefore, in the embodiment shown in FIG. 3A, the laser beam is capable of providing modulated light at about point 72 which is next to edge 74 of medium 66. However, as will be recognized, a printed page usually includes left and right margins. Therefore, although a printed image line could begin at point 72 on a right to left scan of the beam trajectory as shown by trajectory portion 70, the modulated light beam does not actually start to produce an image until point 76 at margin 78 of the right to left portion of the trajectory and stops printing at the left margin 80. This is also indicated at the rightmost dot 82 on the printed image line 84. It is important to again point out that for a laser printer application the photosensitive medium 66 is moving in a direction as indicated by arrow 68. Therefore, to generate the top printed image line 84 between margins 78 and 80 as a horizontal line, the right to left beam trajectory is orthogonally controlled by mirror assembly 50 pivoting on torsional hinges 86A and 86B about axis 30A an appropriate amount so that the resulting line between the beginning right end point 72 and the left ending point 82 is horizontal. That is, the beam trajectory is moved up during a beam sweep by substantially the same amount or distance as the constantly moving photosensitive medium 66 moves up during the right to left beam sweep. After the right to left portion of the beam trajectory is complete at the left edge 88 of medium 66 (i.e., half of the resonant cycle), the mirror is pivoted about torsional hinges 86A and 86B in the opposite direction as the resonant mirror 36 changes the direction of its sweep as indicated by portion 90 of the beam trajectory. Then, when the left to right portion 92 of the trajectory beam sweep (resulting from pivoting about axis 30 on torsional hinges 38A and 38B or mirror apparatus 48) again reaches the left edge 80 of medium 66, the mirror is again pivoted about torsional hinges 86A and 86B to move the left to right portion 92 of the beam trajectory upward as it traverses medium 66 in a manner similar to the right to left portion of the trajectory. Thus, the line of image 94 starting at beginning point 96 and generated during the left to right scan is maintained parallel to the previous generated image line 84. Then as the beam trajectory passes the right edge 74 of the medium 66, the resonant scan mirror apparatus 48 again begins to reverse its direction by pivoting in the opposite direction about torsional hinges 38A and 38B so as to return to the starting point 72. The cycle is then of course repeated for another complete resonant sweep such that two more image lines are produced.

FIG. 3B illustrates a similar beam pattern projected onto a display screen having an orthogonal dimension rather than onto the moving medium of a laser printer. As shown in FIG. 3B, the movement of the beam is the same as discussed with respect to FIG. 3A with respect to portions 70 through 92 of the beam sweep. However, after the beam trajectory passes the right edge 78 of the display screen 66A and begins to reverse its direction by pivoting in the opposite direction about hinges 38A and 38B, instead of returning to point 72 an orthogonal incremental increase is added to index the trajectory, as indicated at 98, the equivalent of one scan line so that the beginning point is now at 72A rather than 72. The resonant cycle then continues as before, except it is orthogonally incremented at the end of every cycle to a new starting point as indicated at points 72B 72C, etc. Once the trajectory has been incremented an amount equal to the full vertical display (i.e., completed a full display frame), the starting point is again repositioned at 72 as indicated by return line 100 and the full raster scan of a new frame begins.

Referring now to FIGS. 4A and 4B, 5A and 5B and 6A and 6B, there are shown top views and side views, respectively, for driving a single axis torsional hinge mirror, such as mirror 36 of FIG. 3, into resonance. As shown, according to these embodiments, the mirror apparatus 102 includes a support frame 104 having two long sides 106A and 106B and two short sides 108A and 108B. The two long sides 106A and 106B are mounted or bonded to a support structure 110 by an adhesive or epoxy by means of stand-offs 112A and 112B. Also as shown in the side view of FIG. 4B, support structure 110 defines a cavity 114. A mirror or reflective surface portion 116 is attached to the two short sides 108A and 108B by a pair of torsional hinges 118A and 118B such that the mirror or reflective surface portion 116 is located above the cavity 114. As is clearly shown, the perimeter of cavity 114 is larger than the perimeter of reflective surface or mirror portion 116 such that mirror 116 can freely rotate around torsional hinges 118A and 118B without hitting the bottom of cavity 114.

As mentioned above, electromagnetic drives have been successfully used to rotate torsional hinged supported mirror 116 about the axis 120 through hinges 118A and 118B. Such electromagnetic drives may be used to set up resonance oscillation of the mirror 116 about its axis in a manner as will be discussed below, but are more useful for controlling the position of a second mirror such as mirror 36A for orthogonally positioning the resonant beam sweep in response to varying signals provided by computational circuitry to be discussed later. Furthermore, such electromagnetic drives require the mounting of electromagnetic coils below the mirror thereby adding cost and taking up space. According to one embodiment of the present invention, mirror 116 is caused to resonant about the axis 120 by electrostatic forces. Therefore, referring again to the embodiment of FIGS. 4A and 4B, there is included a pair of electrostatic drive plates 122A and 122B located below the short sides 108A and 108B of support frame 104. Also as shown in the side view of FIG. 4B, stand-off mounting members 112A and 112B are selected such that a gap 124A and 124B exists between the bottom surface of short sides 108A and 108B and the top surface of electrostatic drive plates 122A and 122B. It has been determined that selecting the thickness of the stand-off mounting 112A and 112B such that gaps 124A and 124B are between about 0.2 $\mu$m and 0.05 $\mu$m is particularly effective.

An alternating voltage is then connected between the mirror support structure 104 and the electrostatic plates 122A and 122B.

As an example, and assuming the mirror is designed to have a resonant frequency about its torsional hinges that is no less than about 40 KHz when used as the scanning mirror of a display device, and between about 1 KHz and 4 KHz when used as the scanning mirror for a printer, if an alternating voltage also having a frequency substantially equivalent to the resonant frequency is connected across the electrostatic plates and the support frame 104, the mirror will begin to oscillate at substantially the frequency of the applied voltage. The actual resonant frequency of a mirror can be determined by maintaining the voltage level constant and varying the frequency of the applied voltage between the two voltage limits. A frequency in which the mirror rotation is maximum, will be the resonant frequency. The oscillations of the mirror results from the vibrational forces generated by the "on/off" electrostatic forces between the mirror support frame 104 and the electrostatic plates 122A and 122B being inertially coupled to the mirror 116 through the torsional hinges 118A and 118B. The resonant frequency of the mirror varies not only according to the size of the mirror itself, but also according to the length, width and thickness of the two torsional hinges 118A and 118B. It should be noted that in the embodiment of FIG. 4A, the torsional hinges 118A and 118B are not attached to the midpoint of sides of mirror portion 116. That is, the axis 120 lying through the torsional hinges 118A and 118B does not divide the mirror portion 116 into two equal parts. As shown, the "bottom" portion of the illustration of mirror 116 is larger than the "top" portion. It will be appreciated, of course, that use of the terms "bottom" portion and "top" portion is for convenience in describing the device and has nothing to do with the actual positioning of the device. Although attaching the hinges "off center" may help initiate resonance in the structure by creating an imbalance, it has been determined that resonance of the mirror may be achieved almost as quickly if the mirror is not off center. Furthermore, stresses may well be reduced and the required energy to maintain resonance may be somewhat less with a balanced arrangement.

Figure 5A:
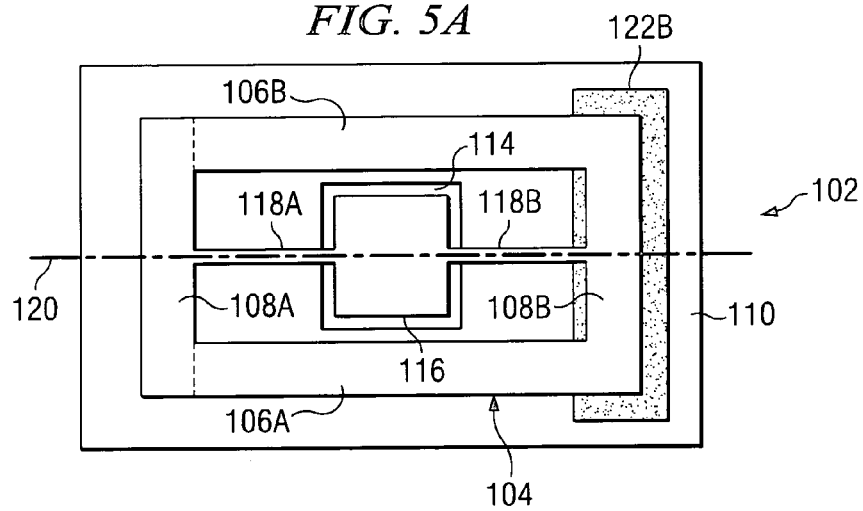
Figure 5B:
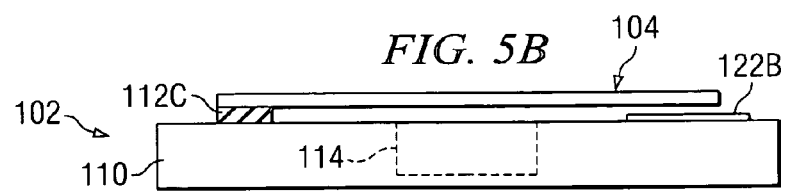

Referring now to FIGS. 5A and 5B, there is a top view and a side view, respectively, of an alternate embodiment for resonating reflective portion 116 of the mirror apparatus 102. The components of the mirror structure of FIGS. 5A and 5B are substantially the same as those for FIGS. 4A and 4B discussed above. However, rather than mounting the support frame 104 to the support structure 110 at the center point of both long side 118A and 118B, one of the two short ends such as, for example, short end 108A is mounted to support structure 110 by a single large stand-off 112C. A single electrostatic plate 122B is then located at a very small spaced distance below the other short end 108B in the same manner as discussed above with respect to FIGS. 4A and 4B. An alternating voltage source is then connected between the mirror structure and the electrostatic plate in the same manner as discussed above. The mirror support frame 104 will again vibrate in response to the on/off electrostatic attraction and the energy in turn is inertially coupled to the reflective portion 116 which begins oscillating about torsional hinges 118A and 118B in the same manner as discussed above.

Figure 6A:
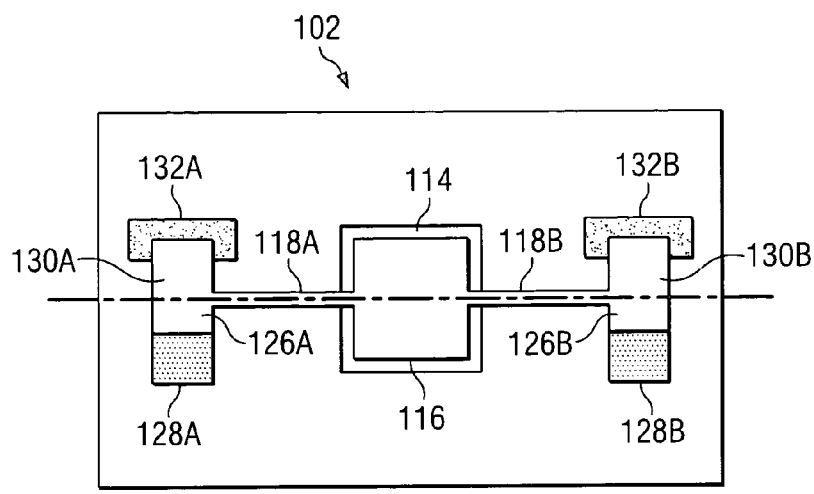
Figure 6B:
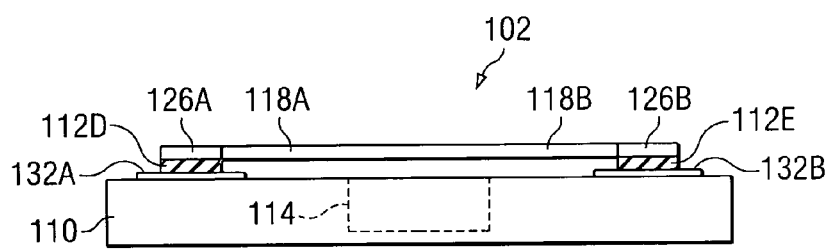

Still another embodiment is illustrated in top and side views FIG. 6A and FIG. 6B respectively. According to this embodiment, torsional hinges 118A and 118B do not extend from the reflective surface portion 116 to a support frame, but instead extend to enlarged anchor members 126A and 126B. End portions 128A and 128B of the anchors 126A and 126B are located or mounted to the support structure 110 by stand-offs 112D and 112E such that the opposite end portions 130A and 130B of each anchor are suspended or spaced above electrostatic plates 132A and 132B by a small gap. Thus, in the same manner as discussed above, an alternating voltage having a frequency substantially the same as the resonant frequency of the mirror 116 about is axis can be connected between the support anchors 126A and 126B and the electrostatic plates 132A and 132B to cause the mirror 116 to resonant and oscillate around the torsional hinges.

Figure 7:
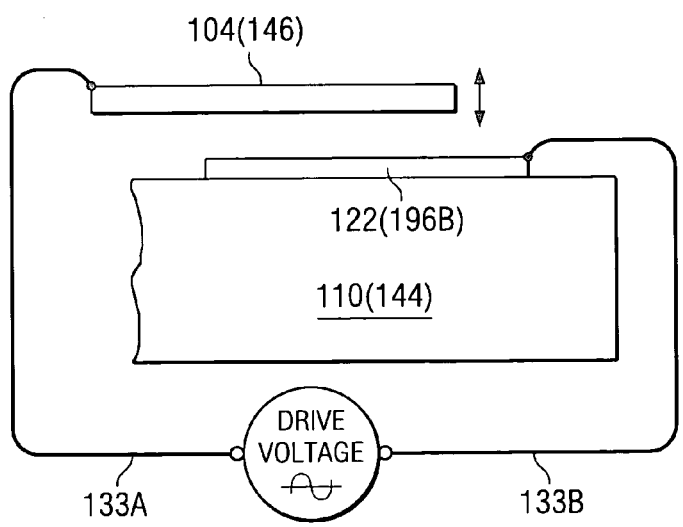
FIG. 7 illustrates the electrical connection between the electrostatic plates and the mirror assemblies of FIGS. 4A and 4B, 5A and 5B and 6A and 6B.
Figure 8A:
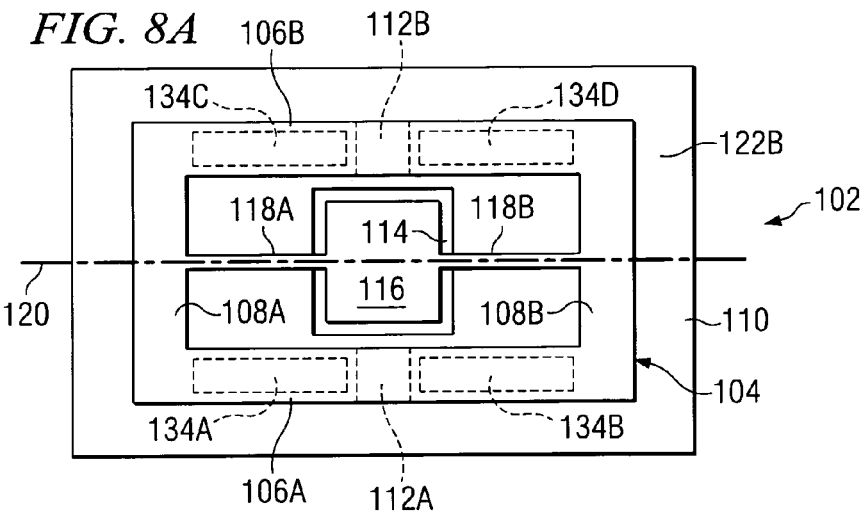
FIGS. 8A and 8B, 9A and 9B and 10A and 10B illustrate different arrangements for using piezoelectric drive circuit to generate the inertially coupled resonant scanning or pivoting about the first or resonant axis of a mirror.
Figure 8B:
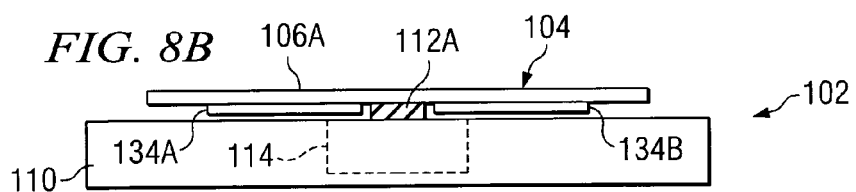
Figure 9A:
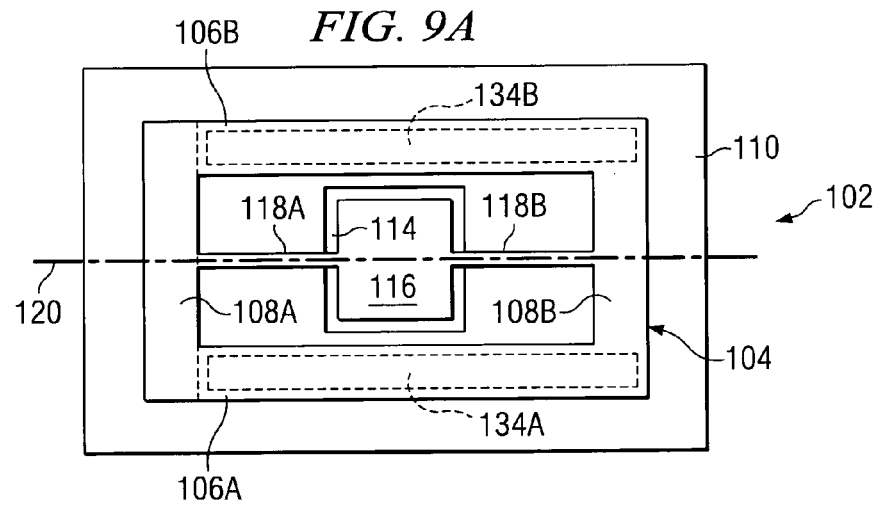
Figure 9B:
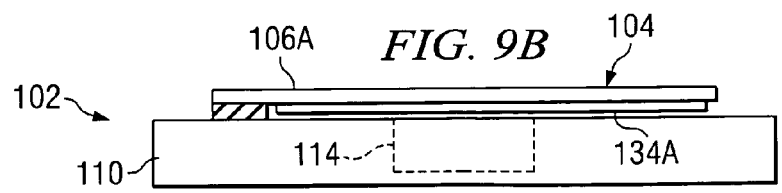
Figure 10A:
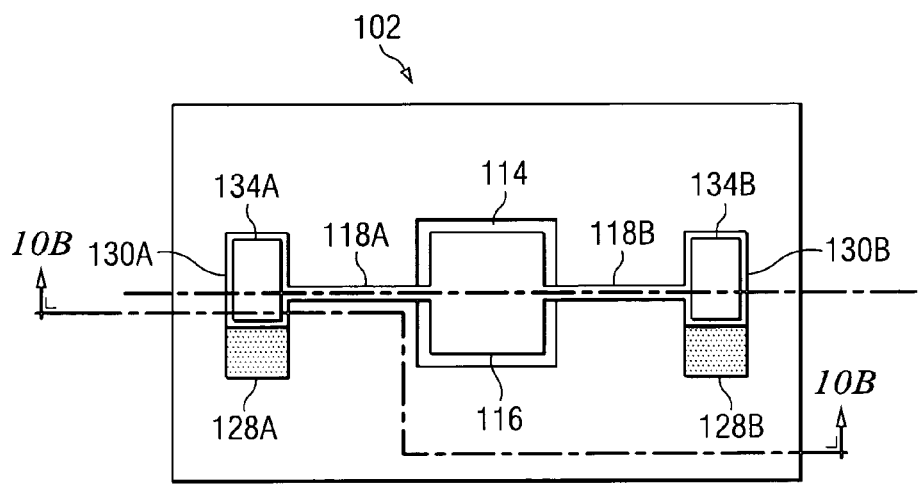
Figure 10B:
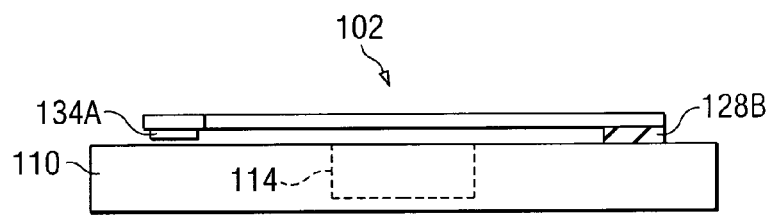

FIG. 7 is applicable to FIGS. 4A and 4B, 5A and 5B and 6A and 6B and illustrates the electrical connections 133A and 133B for applying an alternating voltage between the mirror structure and the electrostatic plates.

FIGS. 8A and 8B, FIGS. 9A and 9B, and FIGS. 10A and 10B illustrate resonant mirror arrangements mounted to the support structure in the same manner as discussed above with respect to FIGS. 4A and 4B, FIGS. 5A and 5B and FIGS. 6A and 6B respectively. However, rather than using electrostatic plates and electrostatic forces to generate resonant motion of the mirror around its torsional axis, these three embodiments employ slices of piezoelectric material 134A, 134B, 134C and/or 134D bonded to the support frame 104 and/or anchors 130A and 130B. The piezoelectric material 134A–134D is sliced such that it bends or curves when a voltage is applied across the length of the strip or slice of material. As will be understood by those skilled in the art, the response time for piezoelectric material will be very fast such that an alternating voltage will cause a strip of the material to bend and curve at the same frequency as the applied voltage. Therefore, since the material is bonded to the support frame 104 or support anchors, 130A and/or 130B, the application of an alternating voltage having a frequency substantially equal to the resonance frequency of the mirror, will cause the vibration motion to be inertially coupled to the reflective portion 116 and to thereby initiate and maintain the resonant oscillation as discussed above.

Figure 11:
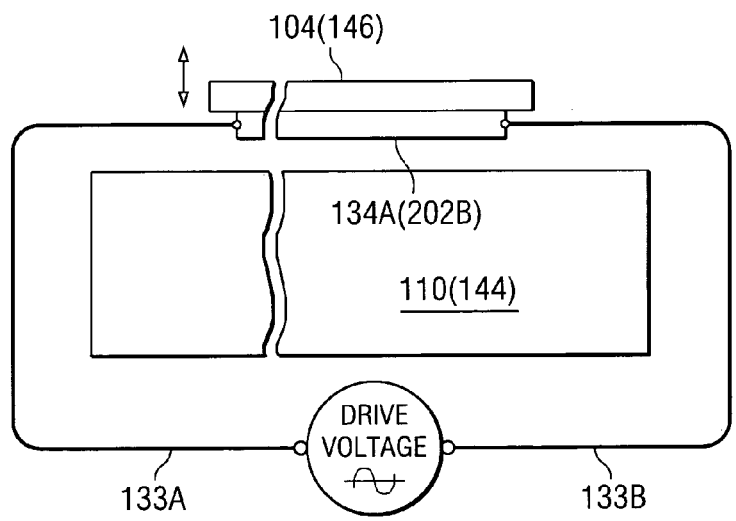
FIG. 11 illustrates the electrical connection between the piezoelectric drive material and the mirror assemblies of FIGS. 8A and 8B, 9A and 9B, and 10A and 10B.

FIG. 11 illustrates the electrical connections for providing an alternating voltage to the mirror structure and the two ends of piezoelectric materials.

Therefore, it will be appreciated that the single axis mirror structure discussed above with respect to FIGS. 4A through 10B may be used as the mirror structure 48 of FIG. 3 to provide the resonant sweep of the two single axis mirror arrangement discussed heretofore with respect to FIG. 3. Movement of the second mirror 50 in the arrangement of FIG. 3 may be directly controlled to provide the necessary orthogonal movement by electromagnetic coils as also discussed above.

Figure 12:
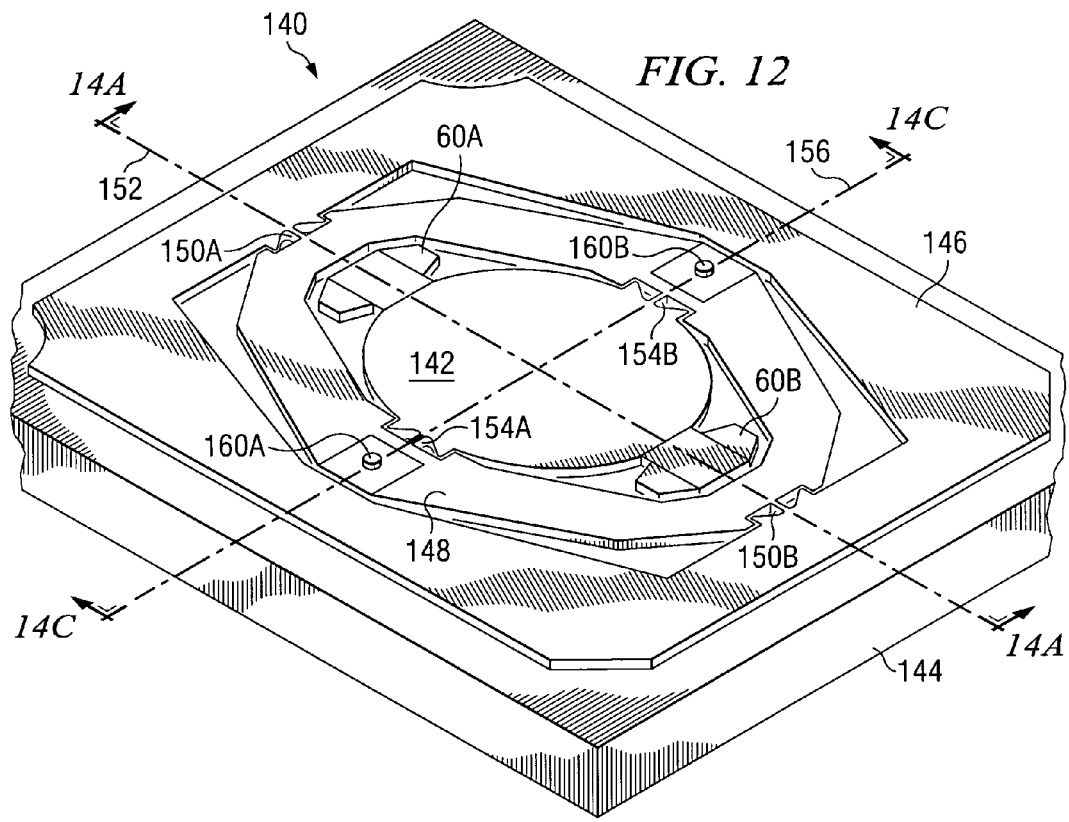
FIGS. 12 and 12A are perspective views of two embodiments of a two-axis torsional hinge mirror having a support frame for generating the bi-directional beam sweep according to the teachings of one embodiment of the present invention.

Referring now to FIG. 12, there is shown a perspective view of a single two-axis bi-directional mirror assembly 140 which can be used to provide resonant scanning or beam sweeps across a projection display screen or moving photosensitive medium as well as adjusting the beam sweep in a direction orthogonal to the resonant oscillations of the reflective surface or mirror portion 142 to maintain spaced parallel image lines produced by the resonant raster beam sweep. As shown, mirror assembly 140 is illustrated as being mounted on a support structure 144. The mirror assembly 140 may be formed from a single piece of substantially planar material and the functional or moving parts may be etched in the planar sheet of material (such as silicon) by techniques similar to those used in semiconductor art. As discussed below, the functional or moving components include, for example, the frame portion 146, an intermediate gimbals portion 148 and the inner mirror portion 142. It will be appreciated that the intermediate gimbals portion 148 is hinged to the frame portion 146 at two ends by a first pair of torsional hinges 150A and 150B spaced apart and aligned along a first axis 152. Except for the first pair of hinges 150A and 150B, the intermediate gimbals portion 148 is separated from the frame portion 146.

The inner, centrally disposed mirror portion 142 having a reflective surface centrally located thereon is attached to gimbals portion 148 at hinges 154A and 154B along a second axis 156 that is orthogonal to or rotated 90° from the first axis. The reflective surface on mirror portion 142 is on the order of about 100–115 microns in thickness and is suitably polished on its upper surface to provide a specular or mirror surface. In order to provide necessary flatness, the mirror is formed with a radius of curvature greater than approximately 2 meters with increasing optical path lengths requiring increasing radius of curvature. The radius of curvature can be controlled by known stress control techniques such as by polishing on both opposite faces and deposition techniques for stress controlled thin films. If desired, a coating of suitable material can be placed on the mirror portion to enhance its reflectivity for specific radiation wavelengths.

Figure 12A:
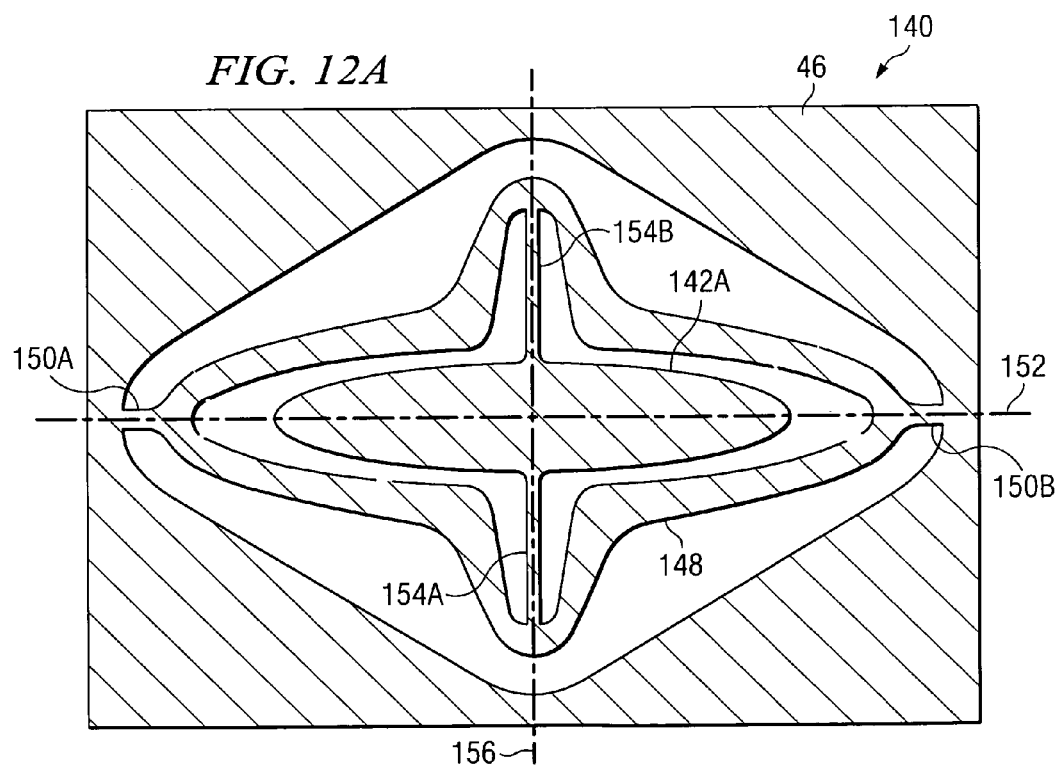

FIG. 12A is an alternate embodiment of a dual axis mirror apparatus having an elongated oval mirror portion 142A. Since the remaining elements of the mirror apparatus shown in FIG. 12A operate or function in the same manner as equivalent elements of FIG. 12, the two figures use common reference numbers.

Figure 13:
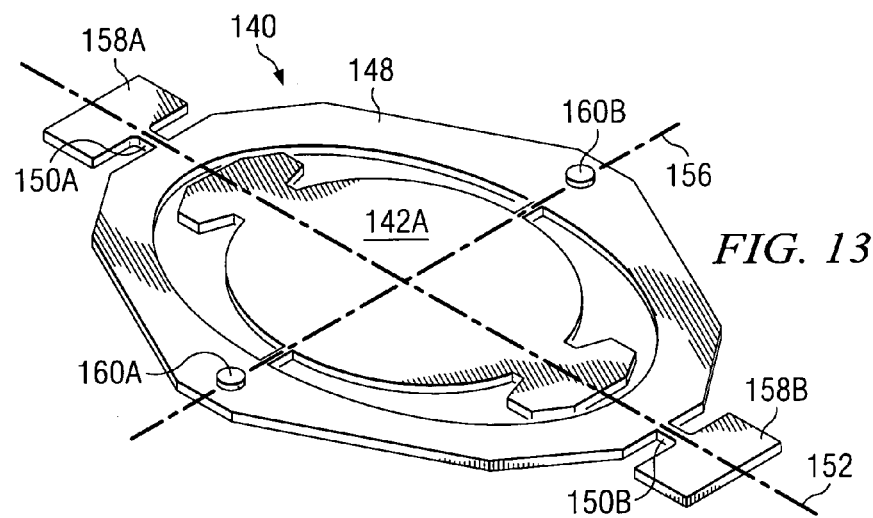
FIG. 13 is a top view of an alternate embodiment of a two-axis torsional hinge mirror supported by "hinge anchors" rather than a support frame.

Referring now to FIG. 13, there is shown another alternate embodiment of a dual axis mirror. In this embodiment, the outside support frame has been eliminated such that the torsional hinges 150A and 150B extend from the gimbals frame or portion 148 to hinge anchors 158A and 158B. Hinge anchors 158A and 158B are of course used to mount or attach the mirror to a support structure such as discussed with respect to FIG. 12. It should also be appreciated that the operation of the dual torsional hinged mirror of FIG. 13 operates the same as the dual torsional hinged mirror discussed with respect to FIGS. 12 and 12A.

Figure 14A:
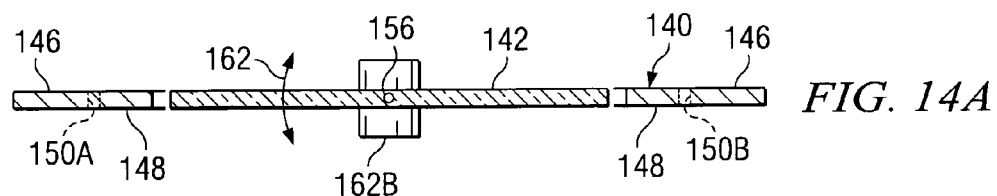
FIGS. 14A–14D are cross-sectional views of the mirror of FIG. 12 illustrating rotation or pivoting of the two sets of torsional hinges.
Figure 14B:
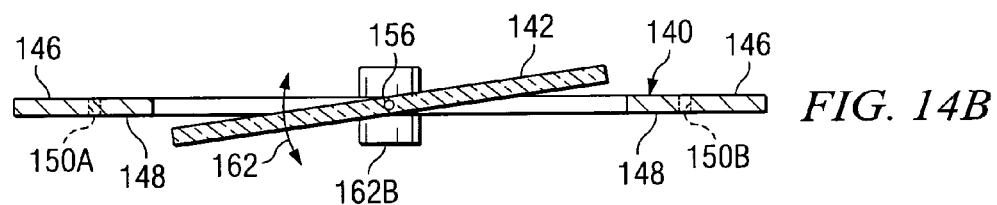
Figure 14C:
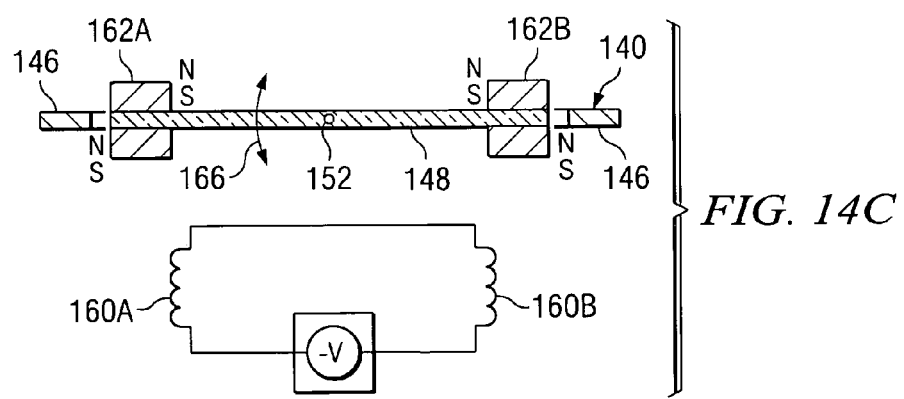
Figure 14D:
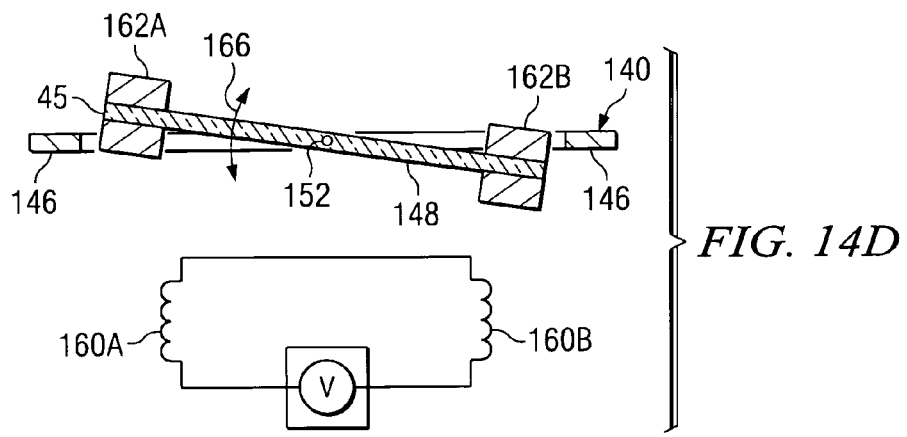

Referring to FIGS. 14, 14B, 14C and 14D along with any one of the mirrors illustrated in FIGS. 12, 12A and 13, the motion of the dual axis mirror will be explained. Mirror assembly 140 will be discussed with respect to inertially coupled driver circuits similar to those discussed above to generate the resonant scanning or beam sweep movement of the mirror 142 about axis 156 illustrated in FIGS. 14A and 14B. The use of such inertially coupled resonance with a single dual axis mirror will be discussed in detail hereinafter. FIGS. 14A and 14B represent a cross-section of the dual axis mirror of FIG. 12 taken along lines 12A—12A (on axis 152), and FIGS. 14C and 14D are cross-sections of FIG. 12 taken along lines 12B—12B (on axis 156).

Whereas the oscillating motion of the reflective surface 142 is provided by resonant drive circuits, motion of the gimbals portion 148 about axis 152 on the other hand, is provided by another type of driver circuits such as, for example, serially connected electromagnetic coils 160A and 160B, which are connected to computational or control circuitry for providing a control signal to provide a pair of electromagnetic forces for attracting and repelling the gimbals portion 148. The gimbals portion 148 may also include a first pair of permanent magnets 162A and 162B mounted on gimbals portion 148 along the axis 156 to enhance the operation of the electromagnetic coils. In order to symmetrically distribute mass about the two axes of rotation to thereby minimize oscillation under shock and vibration, each permanent magnet 160A and 160B preferably comprises an upper magnet set mounted on the top surface of the gimbals portion 148 using conventional attachment techniques such as indium bonding and an aligned lower magnet similarly attached to the lower surface of the gimbals portion 148 as shown in FIGS. 14A through 14D. The magnets of each set are arranged serially such as the north/south pole arrangement indicated in FIG. 14C. There are several possible arrangements of the four sets of magnets which may be used, such as all like poles up; or two sets of like poles up, two sets of like poles down; or three sets of like poles up, one set of like poles down, depending upon magnetic characteristics desired.

As will be discussed, pivoting about axis 152 as shown in FIGS. 14C and 14D will provide the orthogonal scanning (or vertical) motion necessary to generate a series of spaced image lines parallel to each other. Thus, by mounting reflective surface or mirror portion 142 onto to gimbals portion 148 via hinges 154A and 154B, resonant motion of the mirror portion relative to the gimbals portion occurs about axis 156 and the orthogonal sweep or motion occurs about axis 152.

The middle or neutral position of mirror portion 142 is shown in FIG. 14A which is a section taken through the assembly along line 12A—12A (or axis 152) of FIG. 12. Rotation of mirror portion 142 about axis 156 independent of gimbals portion 148 and/or frame portion 146 is shown in FIG. 14B as indicated by arrow 162. FIG. 14C shows the middle position of the mirror assembly 140, similar to that shown in FIG. 14A, but taken along line 12C—12C (or axis 156) of FIG. 12. Rotation of the gimbals portion 148 (which supports mirror portion 142) about axis 152 independent of frame portion 146 is shown in FIG. 14D as indicated by arrow 164. The above arrangement allows independent rotation of mirror portion 142 about the two axes which in turn provides the ability to direct the scanning or raster movement of the light beam about axis 156 and the orthogonal sweep or movement about axis 152.

Figure 15A:
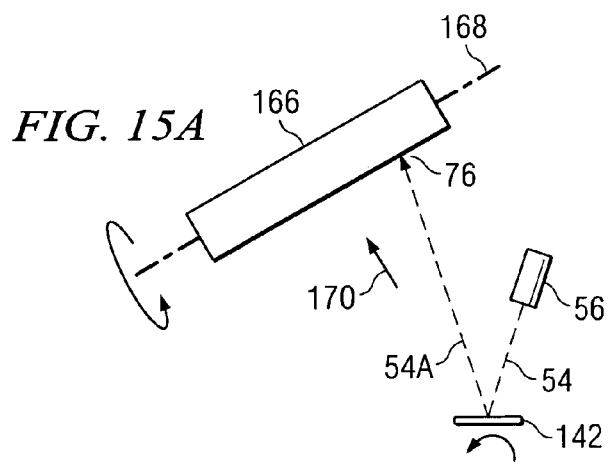
FIGS. 15A, 15B and 15C illustrate the use of a two-axis resonant mirror such as shown in FIGS. 11 and 12 to generate a bi-directional beam sweep across a display screen or a moving photosensitive medium according to teachings of the present invention.
Figure 15B:
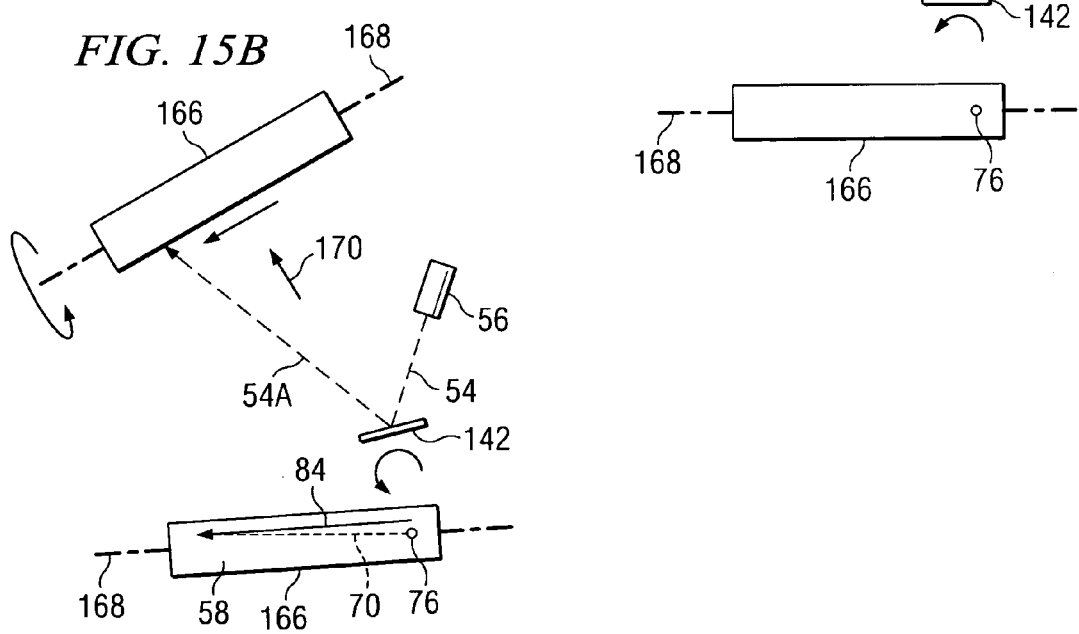
Figure 15C:
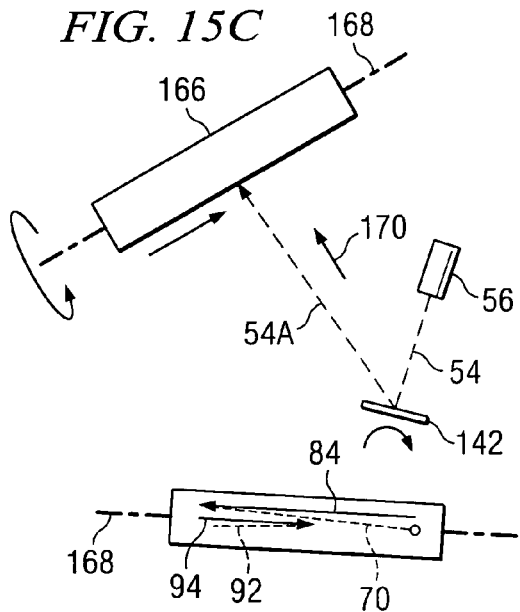

FIGS. 15A, 15B and 15C illustrate the use of a dual orthogonal scanning resonant mirror according to one embodiment of the present invention for providing parallel image lines on a moving photosensitive medium such as a drum 166 rotating around axis 168. The uppermost portions of FIGS. 15A, 15B and 15C are simplified top views of a dual axis mirror for providing a beam sweep on medium or rotating drum 166. The lowermost portion of the figure is a view looking at the medium 166 in a direction as indicated by arrow 170. As can be seen from FIGS. 15A and 15B, the operation of dual orthogonal scanning mirror assembly 140 as it scans from right to left in the figures is substantially the same as a single axis mirror in that it is not necessary to provide orthogonal motion if the mirror is mounted at a slight angle. For example, point 76 on FIG. 15A illustrates the starting point for producing an image line or rotating drum 166 and FIG. 15B illustrates the path of the beam illustrated by line 70 to produce an image line 84 which is at a right angle to the movement of drum 166. However, unlike a single axis resonant mirror and as shown in FIG. 15C, it is not necessary to turn off the laser (light beam) on the return scan, since a return or left to right scan 92 in FIGS. 15A, 15B and 15C can be continuously modulated so as to produce a printed image line 94 on the moving photosensitive medium 166. The second printed line of images 94, according to the present invention, will be parallel to the previously produced line of images 84 generated by the right to left scan 70 of the light beam. This is, of course, accomplished by slight pivoting of the mirror around the secondary axis 152 of the dual axis mirror as was discussed above.

Figure 16:
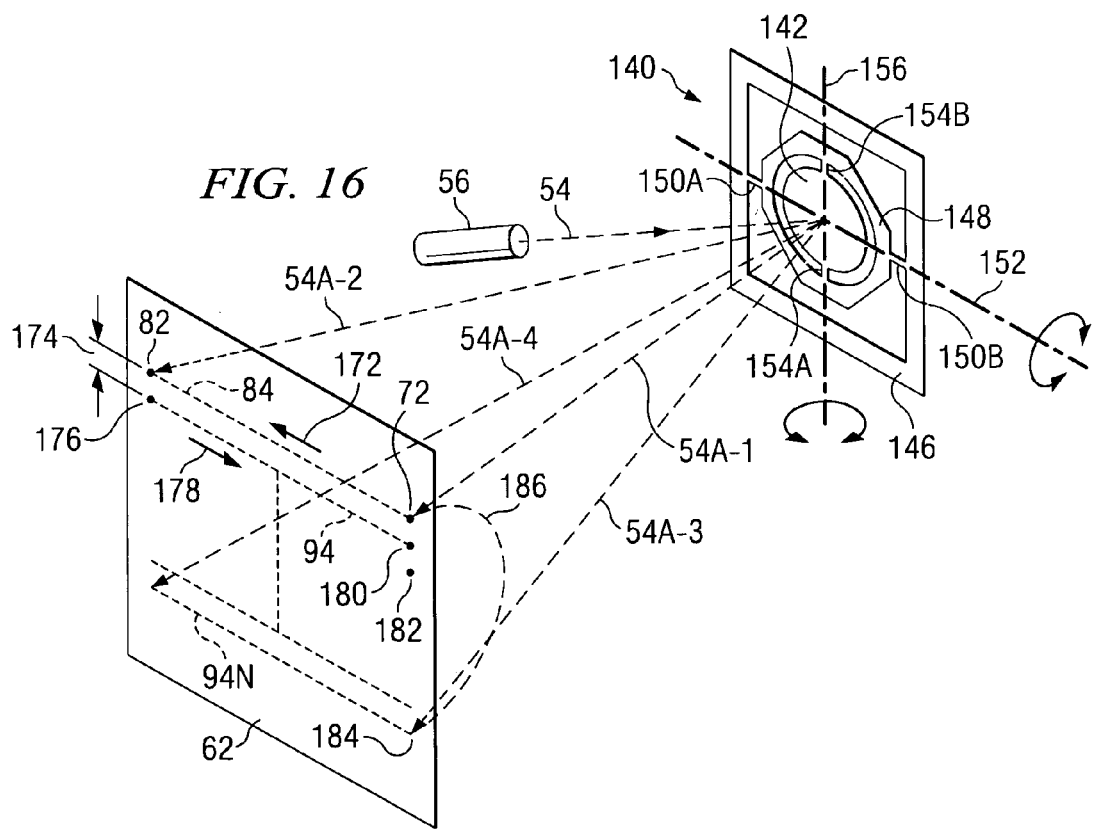
FIG. 16 is a perspective view illustrating the pattern of the bi-directional beam sweep and the resulting parallel beam images as may appear on a moving photosensitive medium or display screen.

The operation of the dual axis mirror with respect to a projection display screen 164 may be better understood by referring to FIG. 16. As shown, a laser light source 56 provides a coherent beam of light 54 to the reflective surface of mirror portion 142 of dual axis mirror apparatus 140 which in turn reflects the beam of light onto a display screen 62. Reflective surface 142 is oscillating back and forth at a resonant frequency about torsional hinges 154A and 154B along axis 156 and thereby sweeps the beam across display screen 62 along image line 84 from location or point 72 to end point 82 as indicated by arrow 172 in the light beam labeled 54A-2. The oscillating mirror 142 then changes direction and at the same time the beam is moved or incremented orthogonally as indicated at path 174 to point 176 and starts the return sweep as indicated by arrow 178 to produce image line 94 between points 176 and 180. After passing point 180, the beam again begins reversing direction and is again incremented to a new start point 182 to begin another back and forth sweep. This process is repeated until the last image line 94N of a display frame ending at point 184 is produced on display screen 62. The beam is then orthogonally moved from end point 184 to start point 72 as indicated by dashed line 186 to start a new display frame. As mentioned above, mirror portion 142 is made to resonate to produce the repetitive beam sweep.

Figure 17A:
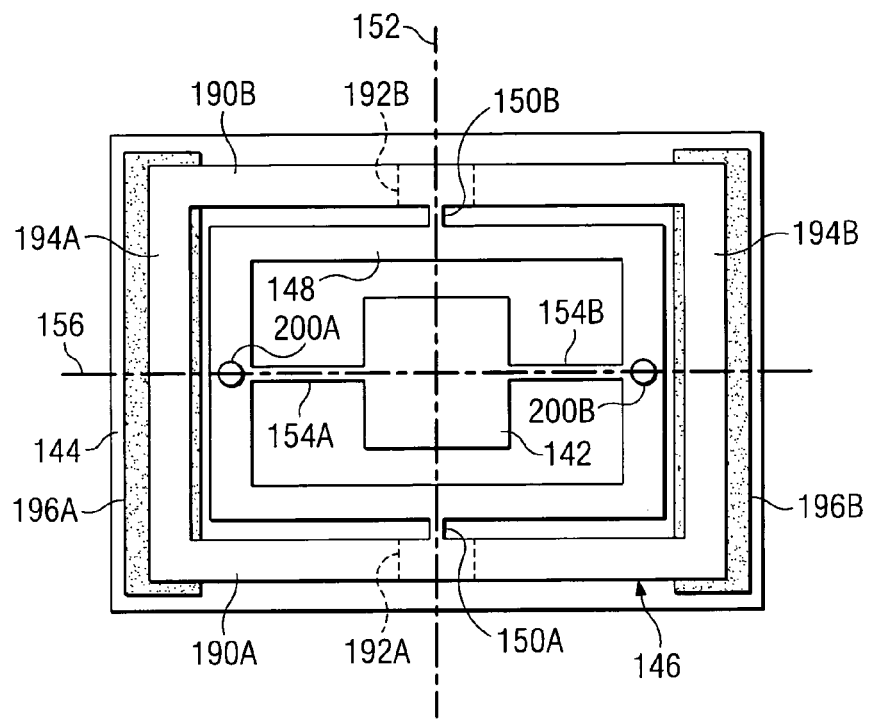
FIGS. 17A and 17B are top and side views, respectively, illustrating electrostatic drive circuitry to generate the resonant scanning or pivoting about a first pair of torsional axis and the location of the electromagnetic drive circuitry for providing orthogonal positioning of the resonant beam sweep for a single dual axis mirror with a support frame.
Figure 17B:
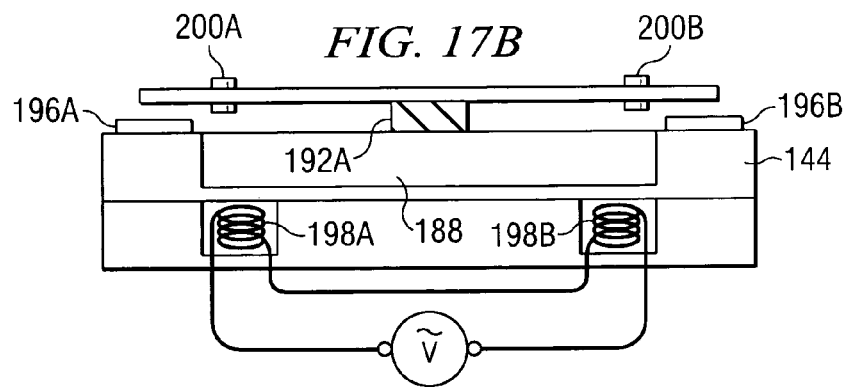
Figure 19:
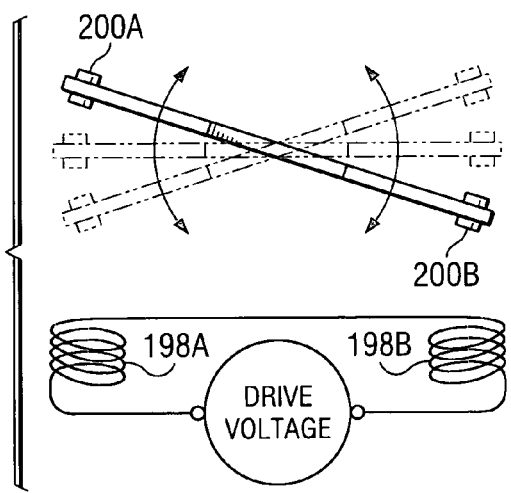
FIG. 19 illustrates the electromagnetic drive circuit for moving the scanning light beam orthogonal to the raster scan for both the electrostatic resonant scan embodiment and the piezoelectric resonant scan embodiment.

Referring now to FIGS. 17A and 17B, there is a simplified top view and side view of the mirror apparatus for generating both the resonant frequency sweeping movement and the orthogonal movement for beam positioning. In a manner discussed above with respect to FIGS. 4A through 6A, a support frame 146 is mounted on a support structure 144 above a cavity 188 such that both mirror portion 142 and gimbals portion 148 can rotate about their respective axes 156 and 152. Support frame 146 is mounted at its long sides 190A and 190B on mounts or spacing members 192A and 192B such that the short ends 194A and 194B are spaced above electrostatic drive plates 196A and 196B by a small gap on the order of between about 0.2 μm and 0.05 μm. An alternating drive voltage having a frequency which is approximately the resonant frequency of the mirror portion 142 about its hinges, is then applied between the electrostatic drive plates and the mirror supporting frame 146 to generate vibrations in the mirror apparatus as was discussed above with respect to a single axis mirror and as was illustrated in FIG. 7. The energy of the vibration is inertially coupled through torsional hinges 150A and 150B to gimbals portion 148 and then through mirror hinges 154A and 154B to the mirror portion 142. This energy vibration at approximately the resonant frequency of the mirror causes the mirror portion 142 to begin resonant oscillations about hinges 154A and 154B along axis 156 and can be used to provide the resonant beam sweep as discussed above. The orthogonal motion is controlled by electromagnetic coils 198A and 198B as shown in FIG. 17B and FIG. 19. As discussed above, permanent magnet sets 200A and 200B may be bonded to the gimbals portion 148 to provide better stability and performance of the orthogonal drive. It should also be understood that although the energy inertially coupled to mirror portion 142 sets the mirror oscillating at a full sweep and at a resonant frequency, the motion of the gimbals frame due to energy from the electrostatic plate is very slight such that the orthogonal movement can still be precisely controlled.

Figure 18A:
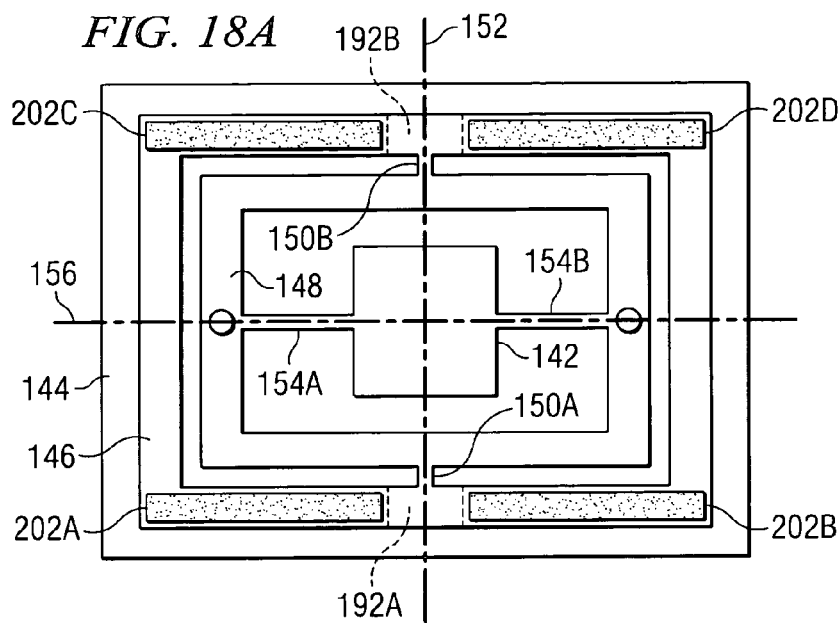
FIGS. 18A and 18B are top and side views, respectively, illustrating piezoelectric drive circuitry to generate the resonant scanning or pivoting about a first pair of torsional axis and the location of the electromagnetic drive circuitry for providing orthogonal positioning of the resonant beam sweep for a single dual axis mirror using hinge anchors.
Figure 18B:
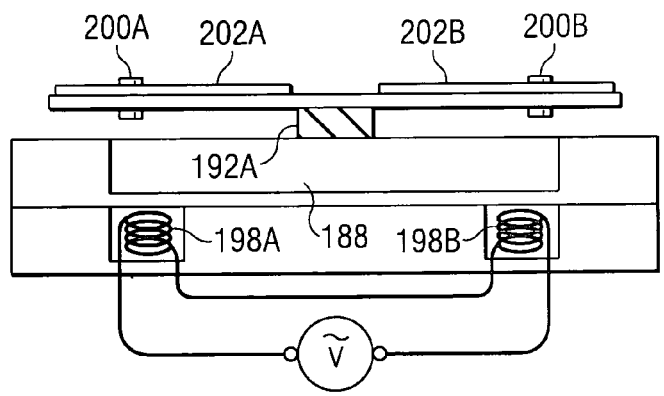

In a similar manner as discussed above with respect to single axis mirrors, the dual axis mirror can also be driven to resonance by a piezoelectric drive circuit. For example, as shown in FIGS. 18A and 18B, support frame 146 is mounted to support structure 144 by mounts 192A and 192B as discussed above with respect to FIGS. 17A and 17B. However, instead of electrostatic plates, slices of piezoelectric material 202A, 202B, 202C and 202D are bonded to the support frame 146. An alternating voltage having a frequency approximately the resonant frequency of mirror portion 142 about torsional axis 154A and 154B is applied between both ends of the slices of piezoelectric material as discussed above with respect to FIG. 11. In the same manner as discussed with respect to FIGS. 17A and 17B, vibrating energy of the mirror resonant frequency is inertially coupled from the frame to the mirror portion 142 so as to put the mirror into resonant oscillation. The resonant oscillation can then be used to provide the resonant beam sweep for a projection display or laser copier and an electromagnetic drive circuitry can be used to provide the necessary orthogonal motion.

The foregoing descriptions of specific embodiments of the present invention have been presented for purposes of illustration and description. They are not intended to be exhaustive or to limit the invention to the precise forms disclosed as many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the claims appended hereto and their equivalents.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A printer comprising:
a light source providing a beam of light;
a first integrally formed device comprising a reflective surface portion positioned to intercept said beam of light, a support portion, and a first pair of torsional hinges attached to said reflective surface portion and extending to said support portion for resonant pivoting about a first axis such that light reflected from said reflective surface defines a first path;
a first drive circuit for generating vibrational energy in said support portion, said vibrational energy inertially coupled through said first pair of torsional hinges to said reflective surface portion to cause resonant pivoting of said first device about said first axis to provide a resonant beam sweep;

a second device for rotating about a second axis such that light from said reflective surface moves in a second direction substantially orthogonal to said first path;

a moving photosensitive medium having a first dimension and a second dimension orthogonal to said first dimension, and located to receive an image of said reflected light beam as said beam sweeps across said medium along said first dimension, said photosensitive medium moving in a direction along said second dimension such that subsequent traces are spaced apart; and a second drive circuit for rotating said second device about said second axis such that light traces are received on said moving photosensitive medium along a line substantially orthogonal to the movement of said photosensitive medium.

2. The printer of claim 1 wherein said first and second devices together comprise an integrally formed single dual axis mirror and wherein said support portion is a gimbals support pivotally attached to a support member by a second pair of torsional hinges and wherein said mirror of said first device is attached to said gimbals support by said first pair of torsional hinges.

3. The printer of claim 1 wherein said first device comprises a first single axis torsional hinged mirror and said second device comprises a second single axis torsional hinged mirror, said second device positioned to intercept said beam of light from said light source and reflect said light beam to said reflective surface of said first device.

4. The printer of claim 1 wherein said moving photosensitive medium is cylindrical shaped and rotates about an axis through the center of said cylinder.

5. A printer comprising:

a light source providing a beam of light;

an integrally formed mirror device comprising a reflective surface portion positioned to intercept said beam of light from said light source, a first hinge arrangement for supporting said reflective surface and for pivoting about a first axis, a gimbals portion and a second hinge arrangement, said gimbals portion attached to said first hinge arrangement and supported by said second hinge arrangement for pivoting about a second axis substantially orthogonal to said first axis such that pivoting of said device about said first axis results in light reflected from said reflective surface defining a first path, and pivoting of said device about said second axis results in said reflective light moving in a second direction substantially orthogonal to said first path;

a first driver for generating vibrational energy inertially coupled through said second hinge arrangement, said gimbals portion and through said first hinge arrangement to said reflective surface portion to cause resonant pivoting of said reflective surface in one direction about said first axis and then the opposite direction;

a moving photosensitive medium having a first dimension and a second dimension orthogonal to said first dimension, and located to receive an image of said reflected light beam as it sweeps or traces across said medium along said first dimension as said mirror device is resonantly pivoting about said first axis, said photosensitive medium moving in a direction along said second dimension such that an image of a subsequent trace of light is spaced from a previous trace; and a second driver for pivoting about said second axis such that traces are received on said moving photosensitive medium along a line substantially orthogonal to the movement of said photosensitive medium.

6. The printer of claim 5 wherein said photosensitive medium is cylindrical shaped and rotates about an axis through the center of said cylinder.

7. The printer of claim 5 wherein said light bean traces on said medium are modulated in both directions such that said printer is a bi-directional printer.

* * * * *